Aug. 23, 1966  A. L. TROUTNER  3,268,251
COMPOSITE TRUSSJOIST WITH END BEARING CLIPS
Filed May 23, 1963  2 Sheets-Sheet 1

INVENTOR
Arthur L. Troutner

BY
ATTORNEY

INVENTOR.
ARTHUR L. TROUTNER
BY James H. Littlepage

3,268,251
COMPOSITE TRUSSJOIST WITH END BEARING CLIPS
Arthur L. Troutner, Skyline Drive, Boise, Idaho
Filed May 23, 1963, Ser. No. 282,806
8 Claims. (Cl. 287—20.92)

This application is a continuation-in-part of my copending application Serial No. 171,958, filed February 8, 1962, now abandoned, for Composite Trussjoist and Reinforcing Clips Therefor, and is directed to the clips disclosed in said application and to a modification in the structure and mode of use of said clips.

This invention relates to composite wood and metal trusses and metal reinforcement clips therefor. It constitutes an improvement applicable to composite trusses of the type disclosed in my copending application Serial No. 60,371, filed October 4, 1960, now Patent No. 3,137,899, entitled, Composite Truss, wherein wooden top and bottom chords have recesses routed in their upper and lower faces. Flattened ends of tubular metal diagonal links are engaged in the recesses and shear pins pass through cross bores in the chords and through eyes in the flat ends of the links. Composite trusses of this type have widespread application, for example, as joists.

The object now is to provide structure for taking the higher stresses, particularly, though not exclusively, for the end or bearing links of a composite trussjoist. More particularly, in respect to one embodiment of the invention, it is intended now to provide angular-clips, and mounting slots therefor in an upper chord, whereby the vertical component of the load imposed by the associated link is transmitted to and distributed across the top of the chord, thereby making the pin stress act nearly parallel to the chord and thus increasing the load-carrying capacity of the joist.

In a second embodiment of the invention, the object is to provide, in a composite truss, clips which engage a pin which connects an endmost link with a chord, wherein the clips have flanges which underlie the face of the chord and lie between the face of the chord and the plate or other element which supports the chord. The clips thus transmit the load imposed by the link directly onto the plate and, by providing holes in portions of the flange which project laterally outward from the chord, the truss may be anchored to the plate by means of screw or nail fasteners.

These and other objects will be apparent in the following specification and drawing, in which.

Figure 1:
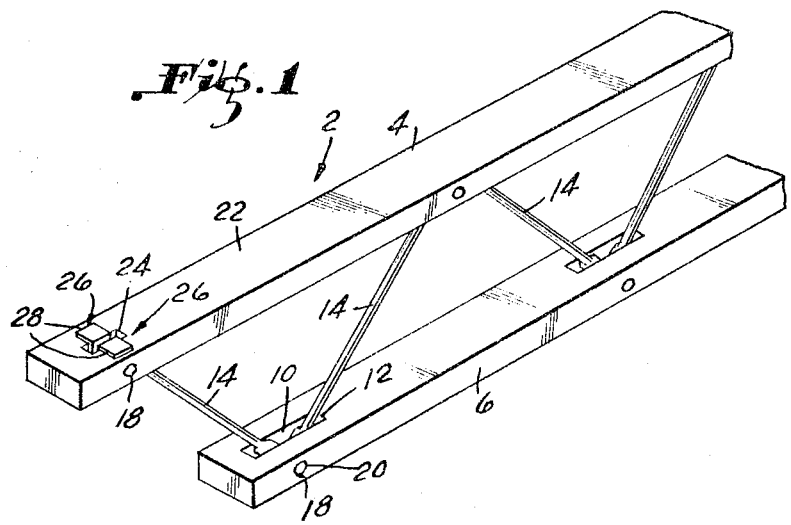
FIG. 1 is an isometric view of part of a composite trussjoist embodying one form of the improvement.
Figures 2, 3:
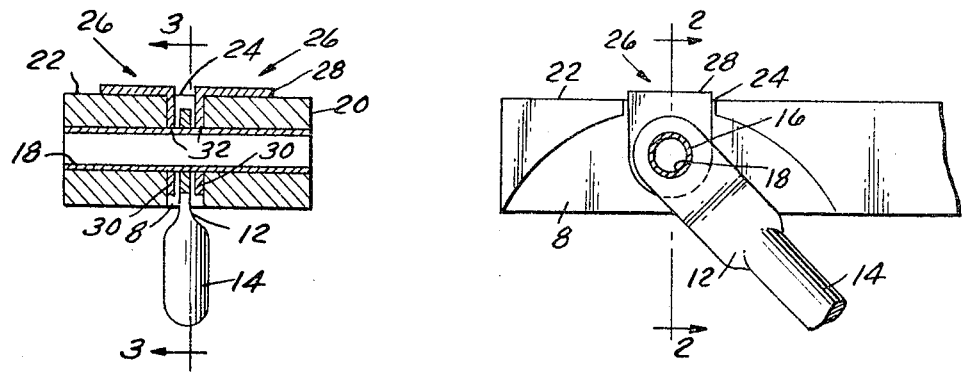
FIG. 2 is a vertical transverse cross-section of the FIG. 1 embodiment, along the line 2—2 of FIG. 3, showing the slot configuration and angle clips adjacent one end of the trussjoist.
FIG. 3 is a vertical longitudinal cross-section along the line 3—3 of FIG. 2.

Referring now to FIGS. 1–3 of the drawings, in which like reference numerals denote similar elements, the first embodiment of the invention is incorporated in a composite trussjoist 2 having upper and lower chords 4 and 6, formed of wooden 2 x 4's. Semicircular recesses 8 and 10 are routed in the lower side of the upper chord and the upper side of the lower chord for receiving the flattened ends 12 of tubular metal diagonal links 14. Link ends 12 have eyes 16 through which snugly fit hollow metal shear pins 18 which comprise cylindrical headless shanks having driving fits through cross bores 20 extending from side to side through the chords and which intersect recesses 8 and 10. The structure thus far described is similar to that disclosed in Serial No. 60,371, supra. This application concerns the structure adjacent the ends of upper chord 4.

In a truss joist wherein the ends of the upper chord are supported on walls, considerable stress is transmitted by the shear pin 18 to the chord on opposite sides of recess 8, such stress having vertical and horizontal components. The first embodiment of the present invention transmits and applies most of the vertical component of the stress imposed by the endmost link 14 across the top 22 of upper chord 4, thus leaving most of the horizontal component of the stress to be applied by pin 8 horizontally and longitudinally of the chord. For this purpose, a vertical slot 24 is routed through the top 22 of upper chord 4, intersecting the curved upper side of endmost recess 8 so as to accommodate a pair of metal angle clips 26. Clips 26 each have a flat base 28 in flat surface engagement with the flat top 22 of the upper chord 4 and a right-angle leg 30 which extends downwardly through and engages flat inner sides of the intersecting slot 24 and recess 8. Holes 32 through clip legs 30 snugly receive the shear pin 18 which extends therethrough. Clips 26 are of sufficient strength and rigidity so that they will not bend or distort under the loads imposed thereon and, by distributing the vertical component of the diagonally applied tension stress in compression across a large surface of the top of the upper chord, the load capacity of the joist is greatly increased over its capabilities where all force components are transmitted by the cross pin alone.

Figure 4:
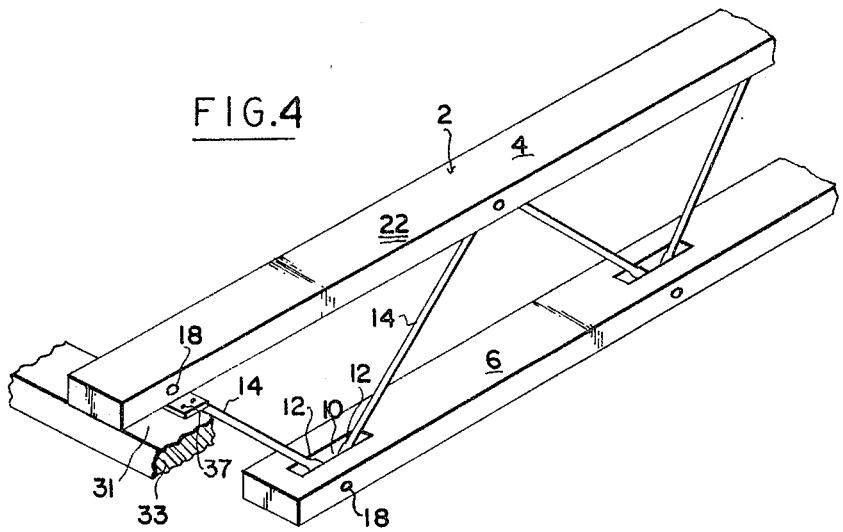
FIG. 4 is an isometric view, comparable to FIG. 1, but illustrating a second embodiment of the invention, and showing a fragment of a supporting plate.
Figures 5, 6:
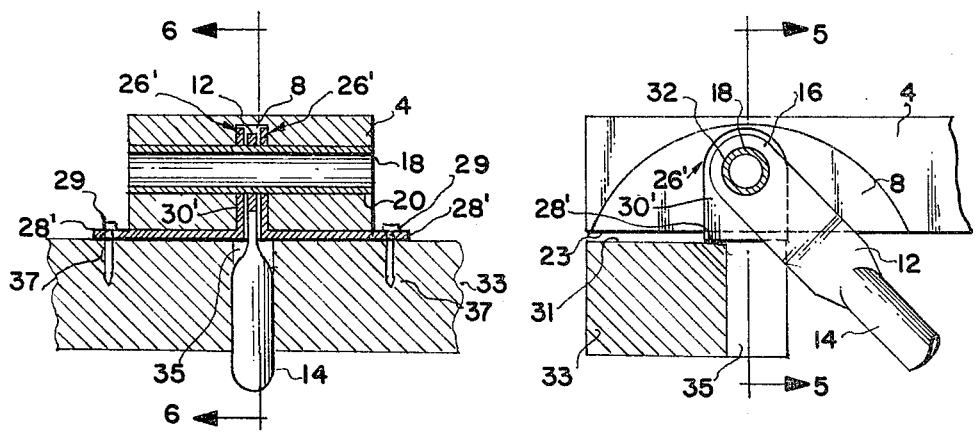
FIG. 5 is a fragmentary vertical transverse cross-section of the FIG. 4 embodiment, along the line 5—5 of FIG. 4; and, FIG. 6 is a fragmentary vertical longitudinal cross-section along the line 6—6 of FIG. 5.

The embodiment illustrated in FIGS. 4–6 is generally similar to that previously described except in that the flanges 28' of clip 26' are somewhat longer than in the FIGS. 1–3 embodiment and are provided with nail or screw holes 29 near their outer ends. Also clips 26' are inverted so that their flanges 28' underlie the lower face 23 of chord 4 and rest upon the upper surface 31 of a supporting plate 33 and their legs 30' extend upwardly into recess 8, wherein they engage around shear pin 18. Plate 33 is notched, as at 35, to accommodate the upper end of the adjacent diagonal 14. Nails 37 driven through holes 29 anchor flanges 28' of clips 26' to plate 33 so as to prevent chord 4 from moving along or off of plate 31.

In the FIGS. 4–6 embodiment, clips 26' transmit both the vertical and horizontal components of the load imposed by the endmost diagonal directly onto plate 33, thereby relieving pin 18 and the surrounding wood of chord 4 from most of these stresses.

In both embodiments of the invention, the clips are intended for use in installations of the trussjoist wherein the upper chord is supported at its ends, and wherein the endmost links are under tension.

This invention is not limited to the details of the structure disclosed and described, but is intended to cover all substitutions, modifications and equivalents within the scope of the following claims.

I claim:

1. In a composite wood and metal truss, including upper and lower wooden chords each having upper and lower flat faces, the upper and lower chords having recesses in the lower and upper faces thereof and cross bores extending from side to side therethrough and intersecting said recesses, the recesses and cross bores in the upper chord being staggered with respect to those in the lower chord, a plurality of metal links disposed in zigzag configuration between the chords, said links having flat ends engaging in said recesses and having eyes through the said flat ends registering with the cross bores, metal cross pins engaging through said cross bores and said eyes, the endmost ones of said links inclining upwardly from an endmost recess in the lower chord and outwardly with respect to an intermediate portion of the lower chord towards an endmost recess in the upper chord, said endmost links normally imposing on the endmost cross pins a load having horizontal and vertical components when said links are under tension, said upper chord having slots extending through the upper side thereof and respectively intersecting the endmost recesses, and metal angle clips having base portions engaging the upper side of said upper chord and leg portions extending downwardly through said slots, said leg portions connecting with said endmost cross pins, whereby to support at least part of the vertical component of said link load on the upper side of said upper chord.

2. In a composite wood and metal truss, including upper and lower wooden chords each having upper and lower flat faces, the upper and lower chords having recesses in the lower and upper faces thereof and cross bores extending from side to side therethrough and intersecting said recesses, the recess and cross bores in the upper chord being staggered with respect to those in the lower chord, a plurality of metal links disposed in zigzag configuration between the chords, said links having flat ends engaging in said recesses and having eyes through the said flat ends registering with the cross bores, metal cross pins engaging through said cross bores and said eyes, the endmost ones of said links inclining upwardly from an endmost recess in the lower chord and outwardly with respect to an intermediate portion of the lower chord towards an endmost recess in the upper chord, said endmost links normally imposing on the endmost cross pins a load having horizontal and vertical components when said links are under tension, said upper chord having slots extending through the upper side thereof and respectively intersecting the endmost recesses, and two pairs of metal right angular clips, each pair having leg portions extending downwardly through one of said slots with an eye therethrough engaging around an endmost cross pin, and base portions engaging against the upper side of said upper chord, whereby to support at least part of the vertical component of said load thereon.

3. In a truss, including upper and lower wooden chords each having upper and lower flat faces, the upper and lower chords having recesses respectively in the lower and upper faces thereof and cross bores extending from side to side therethrough and intersecting said recesses, the recesses and cross bores in the upper chord being staggered with respect to those in the lower chord, a plurality of meal links disposed in zigzag configuration between the chords, said links having flat end means engaging in said recesses and having eyes through the said flat end means registering with the cross bores, metal cross pins engaging through said cross bores and said eyes, the endmost of said links inclining upwardly from an endmost recess in the lower chord and outwardly with respect to an intermediate portion of the lower chord towards an endmost recess in the upper chord, said endmost links normally imposing on the endmost cross pins a load having horizontal and vertical components when said links are under tension, and metal angle clips having leg portions connecting with said endmost cross pins, and base portions engaging against one of the faces of the upper chord.

4. In a truss including wooden upper and lower chords each having upper and lower flat faces, the upper and lower chords having recesses respectively in the lower and upper faces thereof and cross bores extending from side to side therethrough and intersecting said recesses, a plurality of links disposed in zigzag configuration between the chords, means on the ends of said links engaging in said recesses, said means having eyes therethrough registering with the cross bores, metal cross pins engaging through said cross bores and said eyes, the endmost of said links inclining upwardly from an endmost recess in the lower chord and outwardly towards an endmost recess in the upper chord, the ends of said upper chords normally resting upon plates and the endmost links normally imposing on the endmost cross pins a load having horizontal and vertical components when said links are under tension, and metal angle clips having leg portions disposed in the endmost recesses of the upper chords and connecting with the cross pins therein, said clips having base portions engaging between the lower face of the upper chord and said plate for transmitting at least some of the load imposed on the last-named cross pins to said plates.

5. The combination claimed in claim 4, the base portion of said clips extending laterally outward from said upper chord and having fastener apertures therethrough whereby the clips may be anchored to the plate.

6. The combination claimed in claim 5, said clips being substantially L-shape and formed of flat sheet metal.

7. In a truss, including a lower chord and a wooden upper chord having a free end portion having opposed sides and opposed lower and upper faces, said free end portion being adapted to be supported by a plate, a slot in said free end portion disposed between said sides and extending at least partly through said free end from said lower face towards said upper face, a cross bore extending from side to side through said free end portion and intersecting said slot, a cross pin comprising an elongate cylindrical shank engaging in said cross bore and bridging across said slot, at least one end of the pin being of the same diameter as the shank, a link having an upper end anchored to said cross pin, said link extending downwardly and away from said free end portion to said lower chord, and metal clips having leg portions extending into said slot and connecting with said cross pin, said clips having base portions at right angles to said leg portions respectively and disposed beneath the lower face of said free end portion and having outer end portions projecting outwardly beyond the sides of the free end portion, the outer end portions of the base portions of said clips having apertures therethrough for receiving fasteners whereby the clips may be anchored to said plate.

8. In a truss, including parallel wooden upper and lower chords each having opposed sides and opposed upper and lower flat faces, said chords having slots in the faces thereof and cross bores extending from side-to-side therethrough intersecting the slots, the slots and cross bores in one chord being staggered with respect to the slots and cross bores in the other chord, a plurality of links disposed in zigzag configuration between the chords, end means at the ends of said links engaging in said recesses, said end means having eyes therethrough registering with the cross bores, metal cross pins engaging through said cross bores and said eyes, an elongate structural member disposed adjacent a slot in one of said chords with the length thereof transverse to the length of the chords, a pair of flat metal angle clips having leg portions disposed in the last-named slot on respectively opposite sides of the end means on the link engaged therein, said leg portions having eyes therethrough registering with the cross bore which intersects the last-named slot and engaging around the metal cross pin which engages through the eye in the last-named end means, said clips having base portions disposed between one face of the last-named chord and the structural member, said base portions extending laterally outward from said leg portions beyond respectively opposite sides of the last-named chord and having apertures therethrough, and fasteners extending through said apertures connecting said clips to the structural member.

References Cited by the Examiner

UNITED STATES PATENTS 1,813,373 7/1931 Woolridge _____ 52—693

FOREIGN PATENTS 1,225,545 2/1960 France.
547,023 8/1942 Great Britain.

FRANK L. ABBOTT, *Primary Examiner.*

JOHN E. MURTAGH, *Examiner.*